United States Patent [19]

Boyko et al.

[11] Patent Number: 5,355,963
[45] Date of Patent: Oct. 18, 1994

[54] ROTARY OR ACTIVE HARROW

[75] Inventors: Stanley Boyko; Darryl Kerr, both of St. Brieux, Canada

[73] Assignee: F.P. Bourgault Industries Air Seeder Division, Saskatchewan, Canada

[21] Appl. No.: 955,974

[22] Filed: Oct. 2, 1992

[30] Foreign Application Priority Data

Sep. 21, 1992 [CA] Canada ........................ 2078702

[51] Int. Cl.⁵ .................. A01B 21/04; A01B 23/00
[52] U.S. Cl. ........................... 172/383; 172/385; 172/445.2; 172/543; 172/548; 172/556
[58] Field of Search .......... 172/518, 540, 543, 548, 172/556, 177, 96, 643, 705, 456, 21, 22, 383, 385, 389, 445.2; 111/159, 162

[56] References Cited

U.S. PATENT DOCUMENTS

| 989,338 | 4/1911 | Corne ........................ 172/548 |
| 2,503,474 | 4/1950 | Dooley ...................... 172/543 |
| 2,559,048 | 7/1951 | Seaman ..................... 172/543 |
| 3,150,721 | 9/1964 | Van Der Lely . | |
| 3,702,638 | 11/1972 | Takata ....................... 172/540 |
| 4,611,669 | 9/1986 | Ballard ....................... 172/556 |
| 4,629,007 | 12/1986 | Pegoraro .................... 172/548 |
| 4,646,850 | 3/1987 | Brown et al. ............... 172/556 |
| 5,158,145 | 10/1992 | Karchewski ............... 172/548 |

FOREIGN PATENT DOCUMENTS 49351  6/1895  Canada .
155120 1/1910 Canada .

*Primary Examiner*—Clifford D. Crowder
*Assistant Examiner*—Michael A. Neas
*Attorney, Agent, or Firm*—Cushman, Darby & Cushman

[57] ABSTRACT

An active rotary harrow is towed with its longitudinal horizontal axis at an acute angle relative to a line perpendicular to the direction of travel. A plurality of unitary tines are mounted by bolts or rivets on mounting plates which are secured to a shaft aligned along the horizontal axis. Each tine is made from spring steel which is flattened on one end, the flattened portion being mounted directly on the mounting plate by two or more fasteners. The tines are curved such that the outer end of the tine, being rounded in shape, is directed towards the trailing end of the harrow when in operation. The tines, and to a lesser extent, the mounting plates, are resilient in nature and can be deflected towards the trailing end of the harrow, when obstacles such as rocks are encountered. The tines are also capable of some pivotal deflection, to a lesser extent.

6 Claims, 9 Drawing Sheets

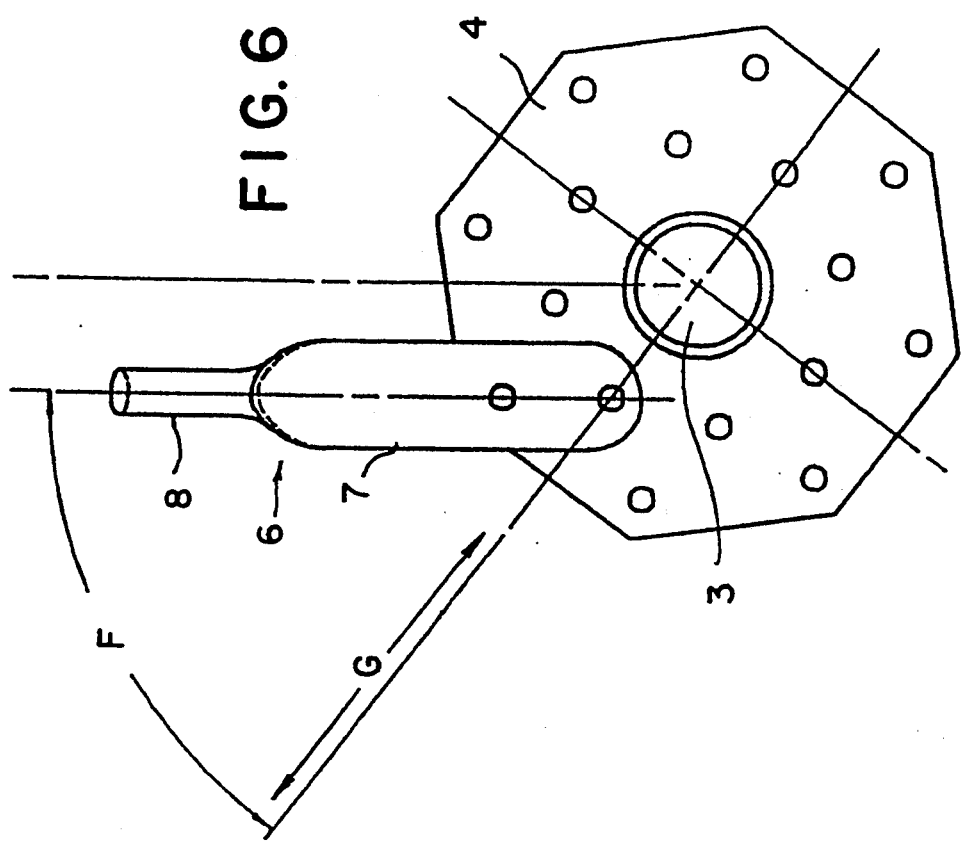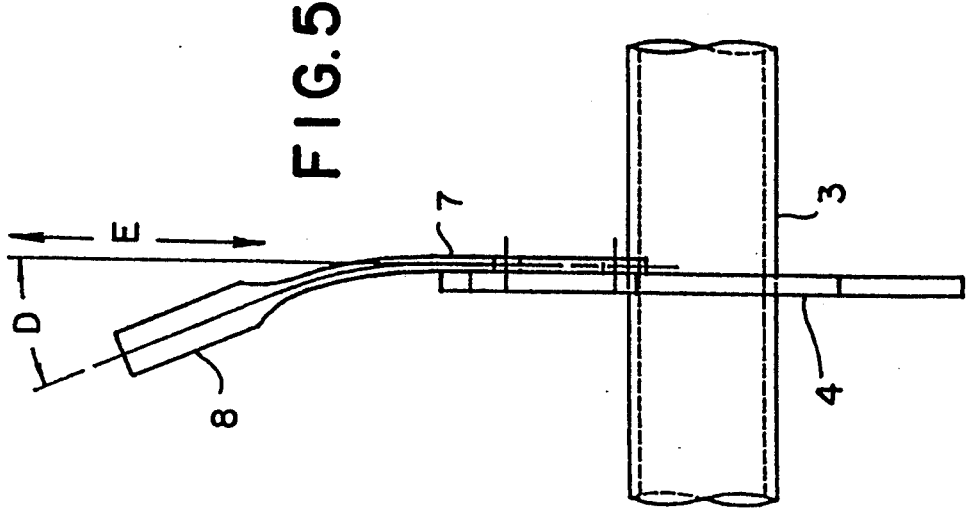

ROTARY OR ACTIVE HARROW

FIELD OF INVENTION

This invention relates to harrows and more particularly to active rotary harrows.

BACKGROUND

Common harrows are well known in the agricultural field. In more recent years rotary-type or active harrows are becoming more prevalent. The reason for this is that active or rotary-type harrows level the surface while leaving trash such as stubble or weeds on the surface. This is extremely beneficial in places such as the plains or prairies where wind erosion of soil has become a serious threat, particularly in dry years. Thus the use of active harrows is a consequence of a trend towards a no till or reduced till type farming operation.

Some known rotary harrows are towed such that the rolling axis is constrained, to an angle generally 20° to 40° from a line perpendicular to the direction of forward motion. This results in the drum being partially dragged longitudinally. This action causes the drum to rotate slower than if it were towed perpendicular to the direction of forward motion. Thus this angled rotation causes each tine to slip while in contact with the land surface, The problem with rotary harrows is that they do not perform well in rocky soils. The tines of the harrow tend to break easily, and the longevity of the implement is greatly reduced. Another problem encountered with the rotary harrows is the difficulty of replacing the tines once they are broken. Some have complicated attachment mechanisms which are next to impossible for the average farmer to repair in the field. Obviously, if each time a tine breaks, it is necessary to call in a welder, the economics of the harrow are greatly diminished.

The use of resilient tines on harrows to promote deflection when the tines encounter obstacles is also known. For the most part however, these known rotary harrows have not operated satisfactorily- In rocky soils they tend to lack the force required to work the soil adequately.

It is therefore an object of the present invention to provide a rotary harrow which is durable and resists breakage of tines in rocky or stoney soils.

It is a further object of this invention to provide a harrow with tines which, when damaged, can be easily replaced by the operator in the field.

It is a further object of this invention to provide a rotary harrow with even tine penetration across the length of the drum.

Finally, it is an object of this invention to provide a rotary harrow which is particularly suited to clay soils and which, when in operation, deposits moisture laden lumps of clay from beneath the ground onto the surface, thus helping to curtail soil erosion.

SUMMARY OF THE INVENTION

Therefore, this invention seeks to provide a rotary harrow, adapted to be pulled behind a power source, comprising a longitudinal horizontally disposed shaft mounted on a frame, for rotation therein, such that, in operation, when said harrow is pulled directly behind said power source, the fore end of said shaft is closer to the power source than the trailing end; a plurality of planar mounting plates fixedly mounted at predetermined distances along said shaft and perpendicular thereto; a plurality of tines circumferentially mounted on each of said mounting plates; each of said tines being of unitary construction having a flattened portion at the inner end for attachment to said mounting plates, and a rounded portion, at the outer end for engagement with the soil; each of said tines being bent along its longitudinal axis such that the inner end of said tine is closer than the outer end of said tine to the fore end of said shaft; wherein in operation said tines are adapted to deflect rearwardly in the direction of the trailing end of said shaft when encountering obstacles in or on the soil.

The invention further seeks to provide a resilient tine for use with a rotary harrow; said tine being constructed from a unitary elongate rod; said rod including a flattened portion at one end and a rounded portion at the opposite end; said flatted portion being adapted for mounting to a rotary harrow and said rounded portion being adapted for engagement with the soil; said tine being curved along its longitudinal axis in a direction such that said flattened portion has one face which is concave along its length.

The present invention uses a rotary harrow having a horizontally disposed central shaft with bearing surfaces at each end. A plurality of substantially circular or octahedral mounting plates are fixedly mounted on the shaft at pre-determined, evenly-spaced intervals. The horizontally disposed shaft is mounted within a frame for rotation therein and at the front of the frame is a yoke or towing member which is attached to a power source. The frame is arranged so that the horizontally disposed shaft is not transverse to the line of travel of the power source but rather is pulled at an angle thus having a fore end and a trailing end. Generally the angle is about 20° to 40° from a line perpendicular to the direction of forward motion.

It is important that the rotary harrow is pulled with the shaft at an angle as this prevents the tines from striking obstacles directly. Rather, the tines strike the obstacles in a manner such that they will be deflected. The tine is unique in that it is unitary, made out of a single piece of preferably spring steel or spring rod which is flattened at one end, for attachment to the mounting plate. The flattened portion protrudes past the mounting plate. A plurality of tines are circumferentially spaced around the periphery of the mounting plates. Each tine is mounted so that its axis is rotated 50° to 60° from a radial direction on the mounting plates. The tines are also produced in a permanently curved state such that one face of the flattened portion of the tine is concave in its length. In other words, the tines are inclined from the plane of the mounting plates in the longitudinal direction of the drum. In operation, all the tines are permanently curved rearwardly in one direction towards the trailing end of the harrow.

The harrow is mounted so that the tines are inclined away from the leading edge and the tips of the non-radial tines are angled opposite to the direction of rotation of the harrow. This gives maximum trash shedding ability as the tine rotates out of the ground behind the harrow.

The tines are resilient and capable of deflection in a direction towards the trailing end of the shaft. This flattened portion allows the tine to flex and absorb the energy of an impact with stones or other obstacles, without damage to the tine or drum. Thus, when the tines strike an obstacle such as a rock they are deflected sideways in a direction substantially parallel to the longitudinal axis of the shaft. In operation, the tines are deflected upwardly and over the obstacle because of the angled direction of the rotary harrow as it moves across the land. The mounting plates may also be made of spring steel, and absorb some of this deflecting force, but to a much lesser extent. The tine is also capable of some deflection radially to the shaft, but to a much lesser degree.

In an alternative embodiment, a resilient material is interspersed between the mounting plates and tines. Such material may comprise a spring, a rubber type plastic such as urethane or any other suitable material. This intermediary increases the resiliency of the tines and this new arrangement is particularly suited for rocky soils. Generally the resilient material is made out of urethane, is about 3 inches long and ½ inch thick, and is bolted to the mounting plate. On the other end of the resilient material the tine is bolted, thus providing give or bend first to the resilient material when an obstacle is struck and thereafter to the tines, thus avoiding breakage.

The ends of the tines are rod-shaped or round in cross-section. This is particularly important because as the rotary harrow is pulled across the land the ends of the tines pick up small lumps or balls of moist soil and deposit them on the surface of the soil. These small wet lumps or balls tend to aid in preventing wind erosion.

To provide clearance for obstacles and to allow the drum to contour over uneven ground, the mounting arm includes at least two pivots. One pivot allows the entire drum and arm to rotate up or down about an axis perpendicular to the direction of motion and a walking pivot allows the drum and arm to tilt about an axis which allows either end of the drum to move up or down independently. Two pivots arranged in this matter allow the drum to clear nearly all obstacles and to contour to nearly any uneven land surface.

Due to the angle at which rotary harrows are towed, there is a side load acting on the ends of the tines in contact with the ground. This side loading can cause an undesirable moment or couple, the magnitude of which is proportional to the distance between the line of action of the side loading (at the ends of the tines in contact with the ground) and the effective line of action of the walking pivot. Any moment will cause the leading edge of the drum to penetrate deeper than the trailing edge, causing poor soil levelling and overall reduced effectiveness.

For this reason, the walking pivot of the present invention is designed such that its line of action virtually intersects the line of action of the side load, resulting in little or no unbalanced moment.

An additional feature may be the use of spring loading to increase tine penetration for more aggressive tillage.

BRIEF DESCRIPTION OF THE DRAWINGS

The invention will be more fully described in conjunction with the following drawings wherein:

FIG. 5 is an expanded view of the portion of FIG. 4 generally shown as 5';

FIG. 6 is an expanded view of a tine mounted on a mounting plate;

DETAILED DESCRIPTION OF THE DRAWINGS

Figure 1:
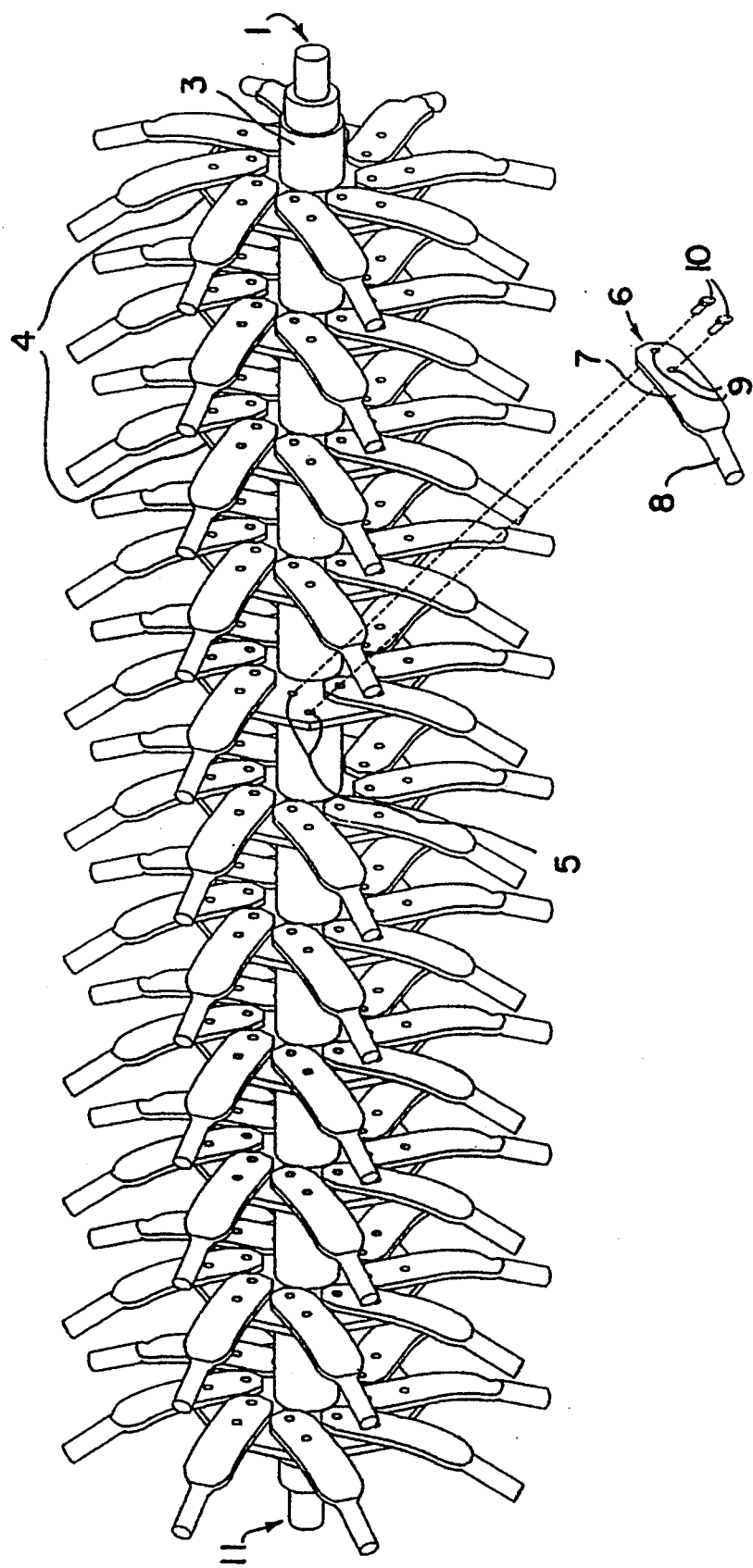
FIGS. 1 and 2 are perspective views of a four foot section of an active harrow.
Figure 2:
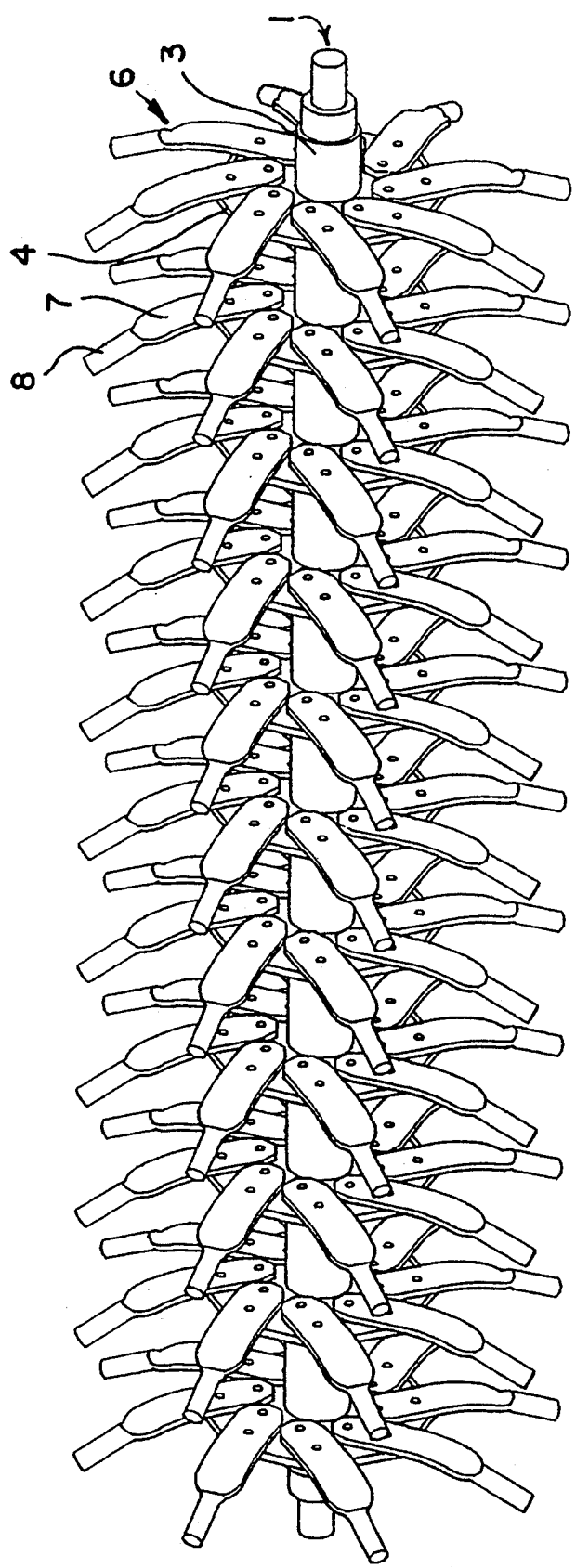

In FIG. 1 a single tine 6 has been removed from a mounting plate 4. The mounting plates 4 are fixedly mounted to the longitudinal shaft 3. The two ends of the shaft 1 and 11 are mounted to a frame (not shown). The mounting plates 4 can be circular or octahedral in shape, and in the embodiment shown in the present invention eight tines 6 are located on each mounting plate 4. The number can be varied. The tines 6 are fastened through their flattened portions 7 by means of bolts 10 (or rivets) through apertures 9 in the tine 6 and in apertures 5 of the mounting plate 4. Thus, if a tine is broken it can be easily replaced by means of a simple wrench.

The tines 6 are divided into a flattened portion 7 and a rod-shaped outer end 8. The tines are constructed from a unitary piece of spring steel. The tines are formed to have a curved configuration such that the inner side of the flattened portion of the tine is concave in its length and the outer side of the flattened portion is convex in its length. The tines 6 are resilient and capable of deflection in a direction substantially parallel to the longitudinal axis of the shaft 3. The ends 8 of the tines 6 are also capable of some radial deflection, when obstacles are encountered, but to a much lesser degree.

Figure 3:
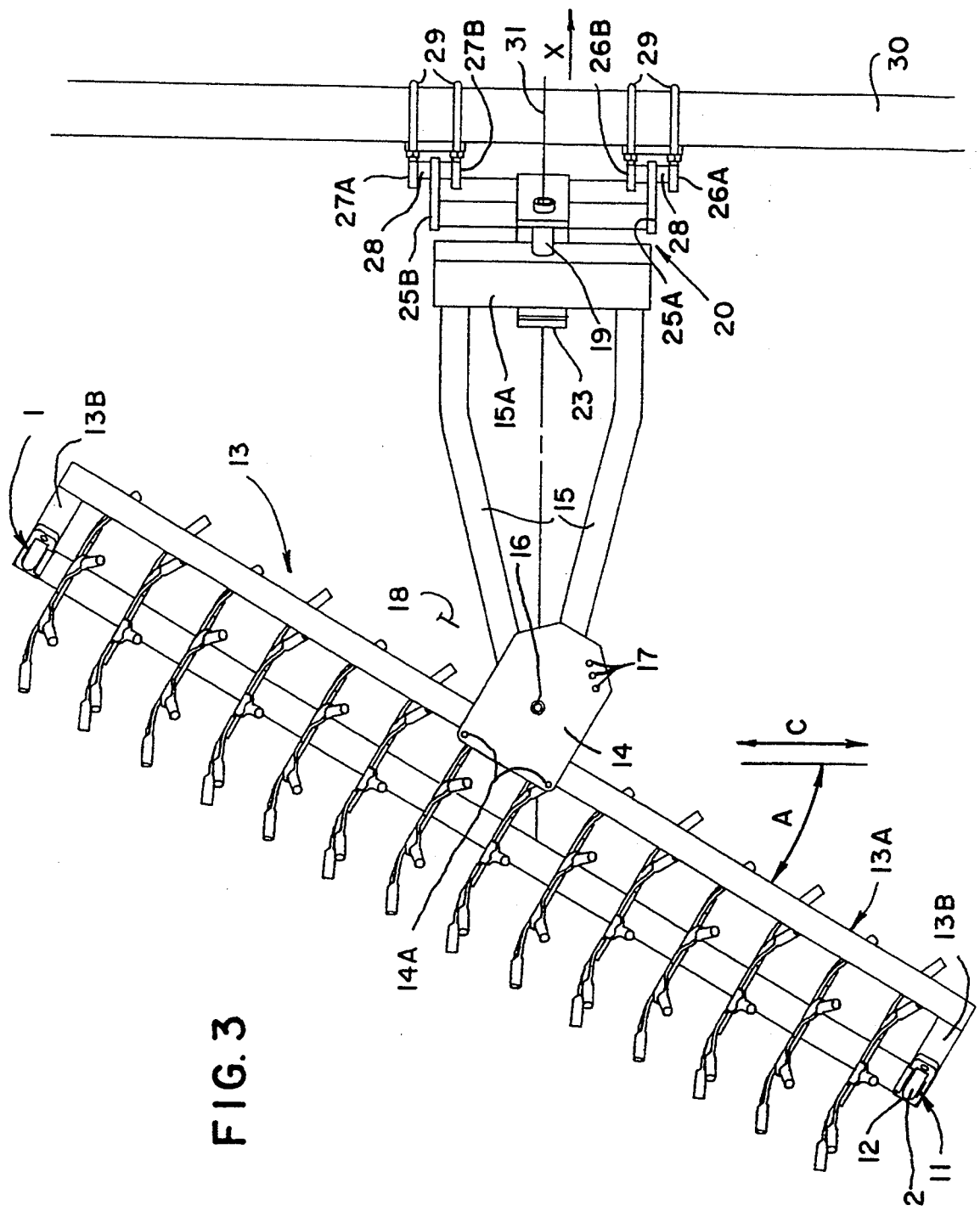
FIG. 3 is a top view of one embodiment of the harrow in the operative position being pulled in the direction X.

In FIG. 3 one views one embodiment of the rotary harrow from above. As the harrow is pulled across the field in a direction shown as X, it rotates about the horizontally disposed axis or shaft 3. The ends 1,11 of the harrow shaft 3 are adapted to rotate within bearings 2 within a pair of pivot brackets 12 fixedly attached to the ends of yoke 13. The yoke 13 consists of a linear yoke frame member 13A which is substantially parallel to the harrow shaft 3. The frame member 13A is bent downwardly and rearwardly at substantially right angles at each end to form end portions 13B which are substantially perpendicular to the shaft 3. A horizontally disposed angle adjustment plate 14 is fixedly attached to yoke 13 by bolts 14A. A pair of walking hitch arms 15, fixedly attached to one another, are pivotally attached to the angle adjustment plate 14 by vertically disposed pivot pin 16. The angle A at which harrow shaft 3 and linear yoke frame member 13A is disposed to a line C perpendicular to the direction of travel X is generally 20° to 40°. The angle A can be adjusted by means of a pin 18 which is placed in one of the angle adjustment apertures 17 located in the angle adjustment plate 14.

Figure 3A:
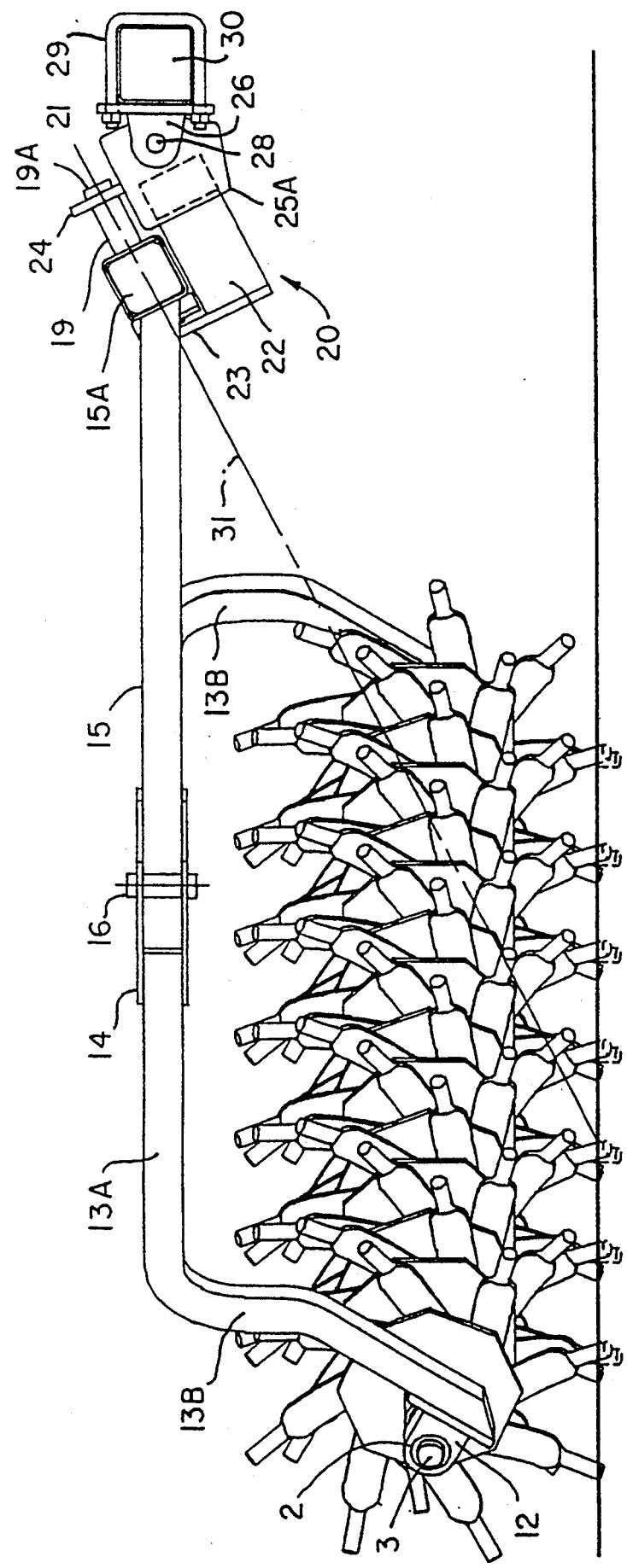
FIG. 3A is a side view of the embodiment.

Fixedly attached to walking hitch arms 15 at right angles thereto is a transverse front beam 15A. As shown in FIG. 3A, transverse front beam 15A is welded to a tubular member 19 through which a pivot pin 19A is inserted to allow the walking hitch member 15 to rock about an axis located at an angle acute to the horizontal. Two-dimensional pivot bracket 20 is comprised of a rearwardly extended portion 22 and two upwardly extending walking pivot brackets 23 and 24 fixedly welded to portion 22. Walking pivot brackets 23 and 24 are adapted to permit walking pivot pin 19A to pass therethrough. The two-dimension pivot bracket 20 is pivotally mounted to a tow bar or drawbar 30 which lies generally horizontally transverse to the direction of travel. Fixedly mounted to rearwardly extended portion 22 are right limiting stop bracket 25A and left limiting stop bracket 25B. These brackets are equipped with an aperture and limit the downward or upward movement of the rotary harrow. A pair of right horizontal pivot brackets 26A,26B and left horizontal pivot brackets 27A,27B are attached to drawbar 30 by means of U-clamps 29. Horizontal pivot pins 28 are inserted through right and left horizontal pivot brackets 26A,26B,27A,27B and right limiting stop brackets and left limiting stop brackets 25A and 25B, respectively. The walking pivot axis intersects with the line of the ground engaging force which is parallel to longitudinal shaft 3.

Pivot pins 28 allow the entire harrow to pivot up or down about a horizontal axis while pivot pin 19A allows either end of the harrow to move up or down independently about the axis 31.

FIG. 3A is a side view of the same implement as FIG. 3.

Figure 4:
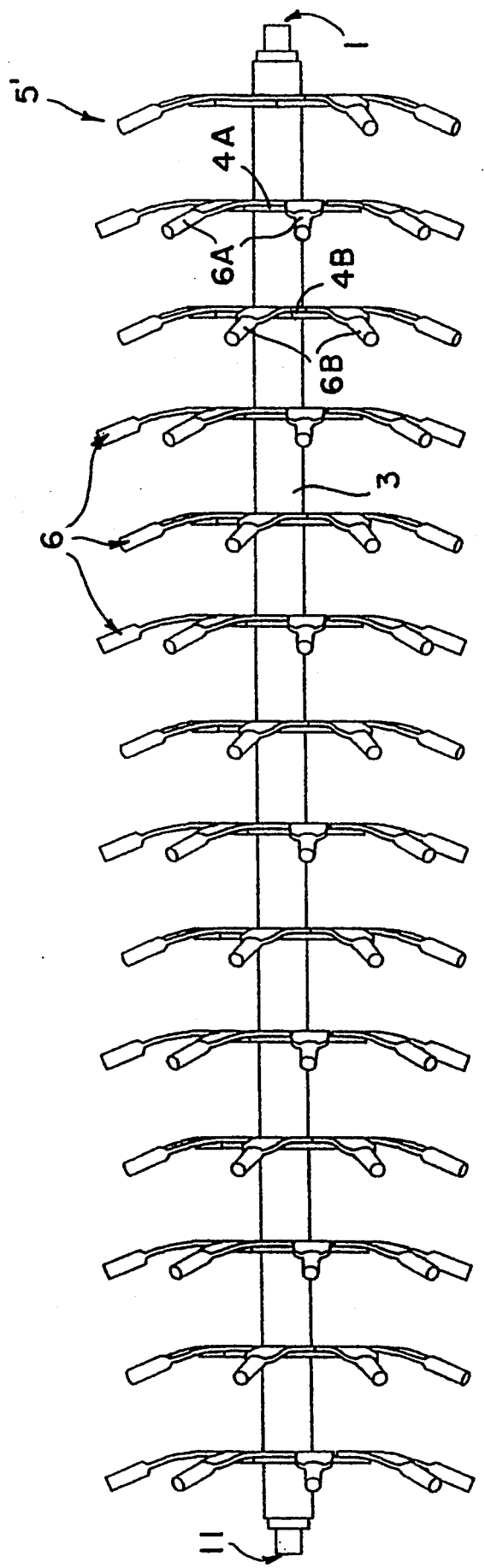
FIG. 4 is a face view of a harrow section.

In FIG. 4, the tines 6 are shown bent in the same direction towards the trailing end 11 of the harrow. This arrangement in operation gives maximum trash shedding ability. One also notes that the tines, i.e. 6A,6B on each successive mounting plate, i.e. 4A,4B are staggered laterally to obtain the maximum levelling effect of the ground. In operation when a tine hits an obstacle it is deflected towards the trailing end 11 of the shaft and then springs back to its normal position. The outer ends of the tines 6 pick up small lumps or balls of moist soil from under the harrow and deposit them on the surface of the ground thus aiding in the prevention of erosion. The soil is levelled without pulverization. The harrow also leaves stubble or weeds on the surface of the soil which also aid in preventing erosion.

It should also be understood that the mounting plates 4 can be bent towards the trailing end of the harrow and the flattened tines attached thereto are straight giving the same effect.

FIG. 5 is an expanded view of the area 5' of FIG. 4. The end 8 of the tine 6 is bent towards the trailing end 11 of the harrow at an angle D of 20° to 30° from the radial plane.

It has been shown that tines bent at this angle have the best trash shedding, and obstacle deflection attributes.

FIG. 6 is an expanded view of a mounting plate 4 with a tine 6 mounted thereon. The tines are mounted such that the longitudinal axis of the tine is rotated such that angle F is 50° to 60° away from the radial direction "G". Thus in operation the tines extend outwardly in the opposite direction to the direction of rotation of the harrow. This arrangement also produces the trash shedding attributes.

Figure 7:
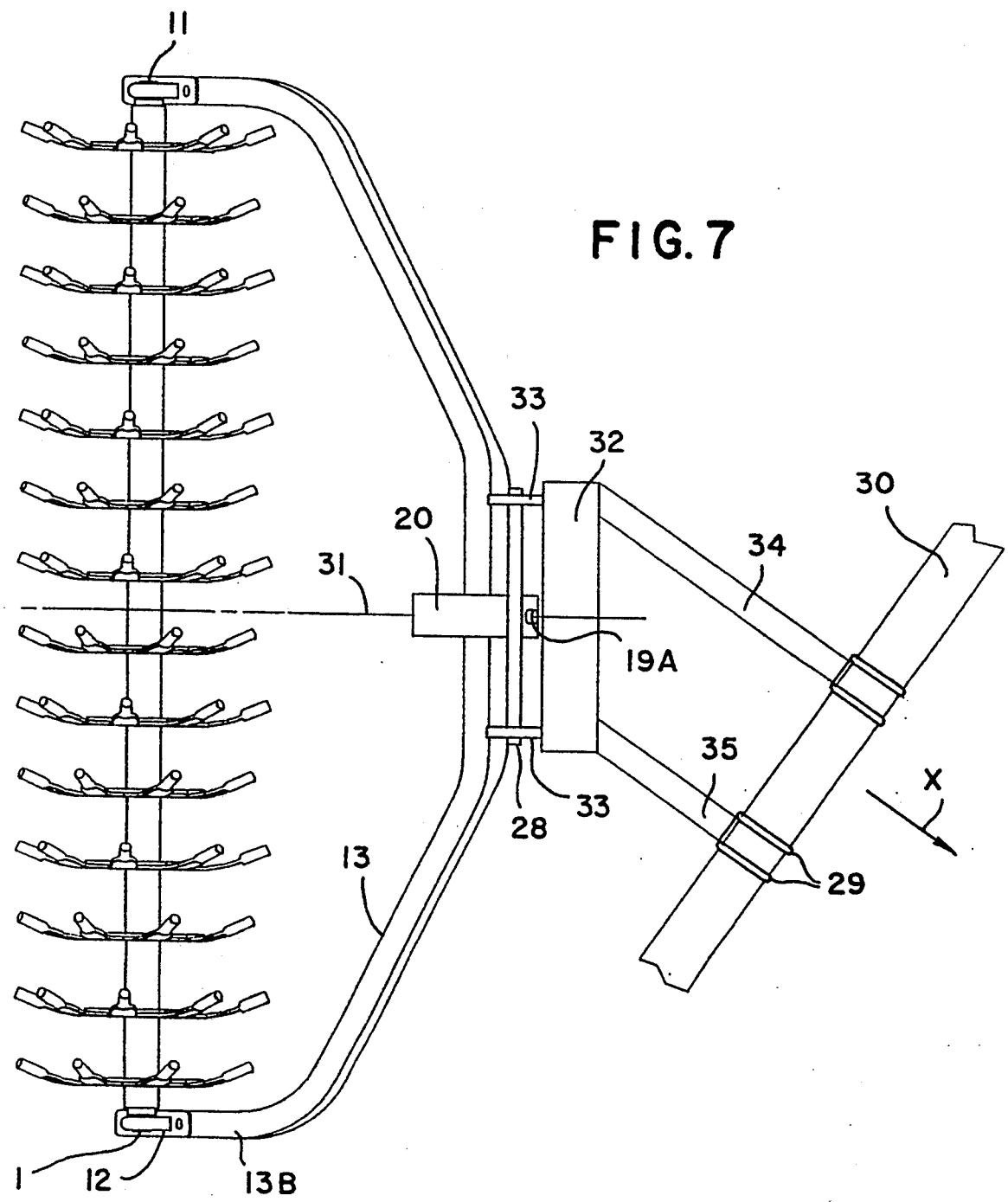
FIG. 7 is a top view of an alternate embodiment of a rotary harrow.
Figure 7A:
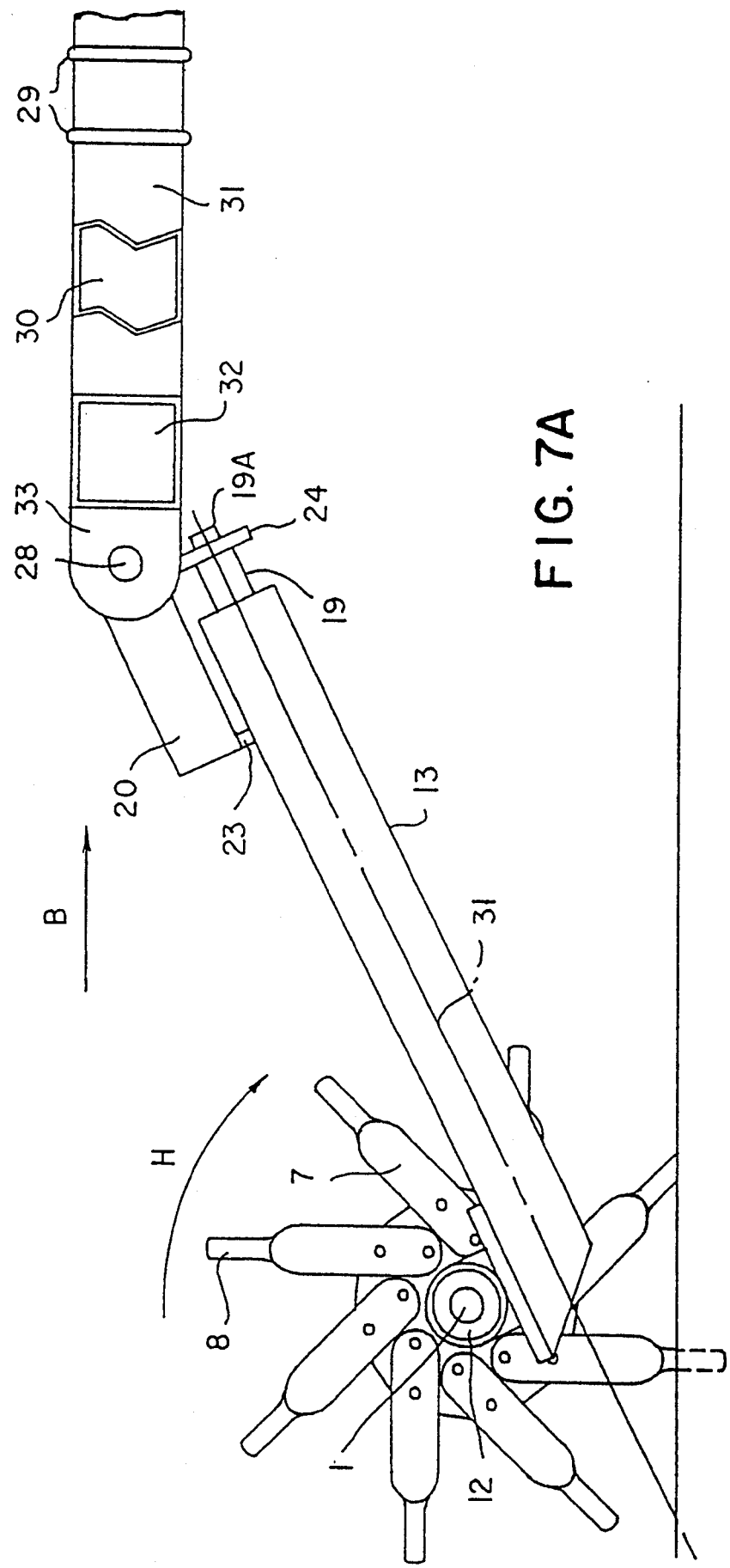
FIG. 7A is a side view of the harrow shown in FIG. 7.
Figure 8:
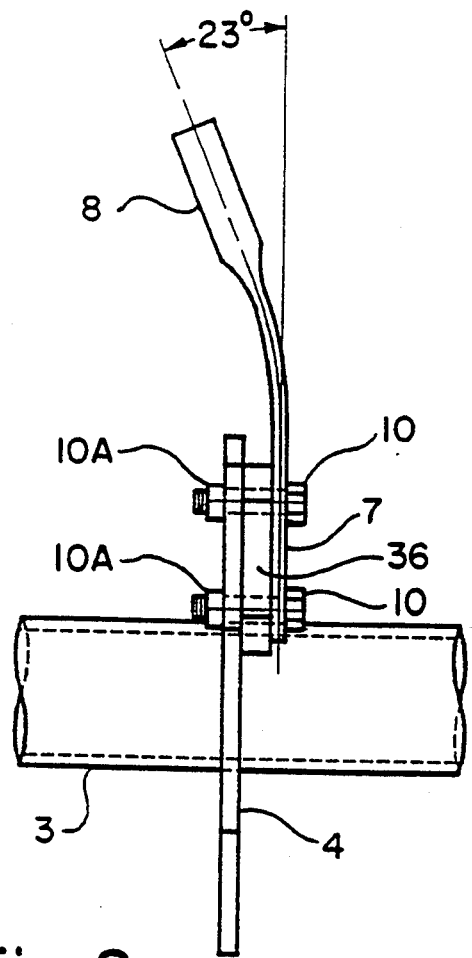
FIG. 8 is a side view of an alternative embodiment of attachment of a tine to a mounting plate.
Figure 8A:
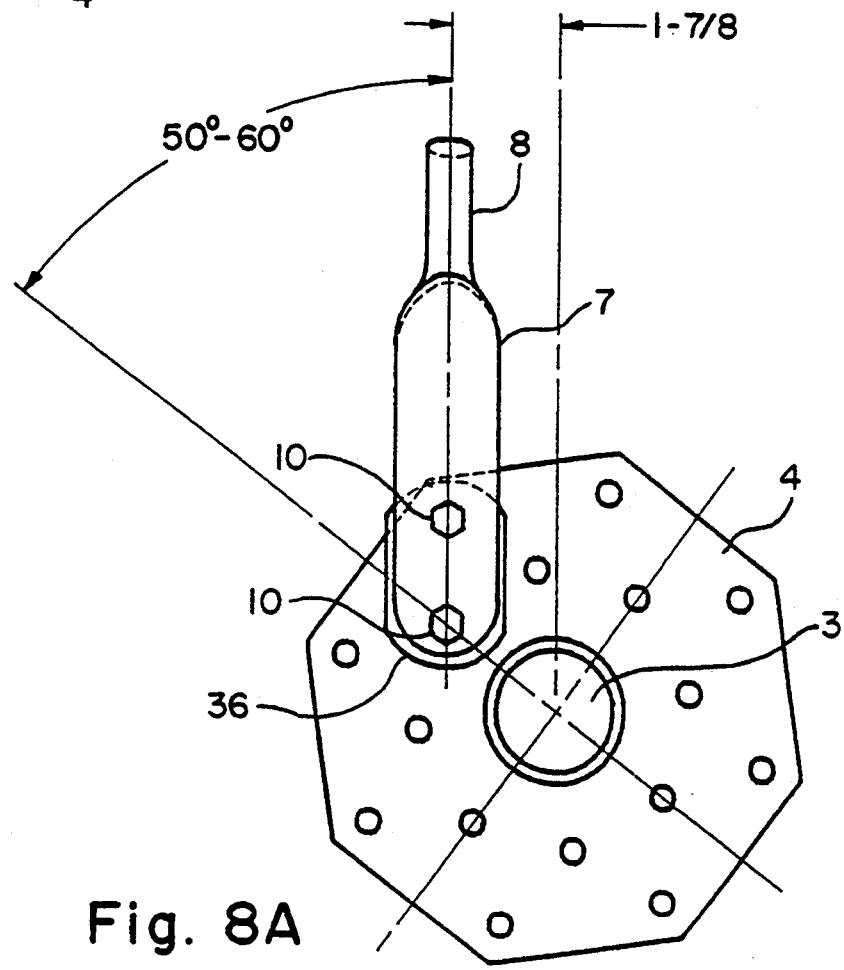
FIG. 8A is a face view of the embodiment of FIG. 8.

FIG. 7 shows a top view of an alternate embodiment of the active harrow of the present invention. The direction of travel is shown as X. Fixedly attached by means of U-bolts 29 to towing implement drawbar 30 is a pair of parallel spaced apart frame members 34 and 35. Frame member 34 is considerably longer than 35 in order that the rotary harrow can be towed at the desired acute angle to a line perpendicular to the line of travel. In FIG. 7 the end 11 of axle 3 is the trailing end towards which the ends of the tines are directed. Frame members 34 and 35 are fixedly attached at an angle to cross member 32. Fixedly attached to cross member 32 is a pair of horizontal pivot brackets 33 through which horizontal pivot pin 28 is disposed. Two-dimensional walking pivot bracket 20 pivots about horizontal pivot pin 28 and is pivotally attached to yoke 13 by walking pivot brackets 23,24 which are adapted to have walking pivot pin 19A pass therethrough, as shown in FIG. 7A. Yoke 13 also pivots about axis 31 by means of pin 19A disposed within tubular sleeve 19. This second pivot permits the harrow to lift up at end 1 or the opposite end 11 over obstacles such as rocks, or to follow uneven terrain.

The two embodiments of the harrow demonstrate how the invention overcomes the resultant unbalanced moment from side loading which, in prior art harrows, causes the leading edge of the harrow to penetrate the soil deeper than the trailing edge. By aligning the line of action of the side loading (at the ends 8 of the tines 6 in contact with the ground) with the line of action of the pivot 19A there is little or no unbalanced moment.

In operation, the harrow is pulled over the soil as shown in FIG. 3 at an angle A of 20° to 40° from a line C which is perpendicular to the line of travel X. Pivot pins 19A,28 permit the harrow to move up and down and side to side depending upon obstacles encountered and the contour of the land. The tines 6, upon striking obstacles such as rocks, are deflected rearwardly parallel to the longitudinal axis of the shaft 3 towards the trailing end 11. The tines also tend to shed trash easily because of their positioning.

Preferred embodiments of the invention have been shown in detail herein but it is understood that any rotary harrow pulled at an angle and having a specialized flattened spring steel type of tine curved to face rearwardly and deflect rearwardly towards the trailing end of the shaft is within the spirit of the present invention.

What we claim as our invention is:

1. A rotary harrow adapted to be pulled behind a power source, comprising: a longitudinal horizontally disposed shaft mounted in a frame, for rotation therein, such that in operation when said harrow is pulled by said power source, said shaft rotates at an acute angle to a line perpendicular to the line of travel, thus comprising a forward end and a trailing end;

said frame including;

a yoke;

an angle means including:

an angle adjustment plate, said plate being fixedly attached to said yoke and pivotally attached to said walking pivot hitch;

said plate including a plurality of apertures adapted to receive a pin;

a walking pivot hitch, said walking pivot hitch being pivotally mounted to a power source, such that in operation, said harrow, when encountering obstacles or uneven terrain, can move or down about an axis or tilt side to side about a second axis, said second axis being located to prevent the creation of an undesirable moment caused by side loading on the tines;

a plurality of planar plates fixedly mounted at predetermined distances along said shaft and perpendicular thereto;

a plurality of tines circumferentially mounted on each of said mounting plates;

each of said tines being of unitary construction having a flattened portion at the inner end for attachment to said mounting plates, and a rounded portion, at the outer end for engagement with the soil;

each of said tines being bent along its longitudinal axis such that the inner ends of said tines are closer than the outer ends of said tines to the forward end of said shaft;

wherein when in operation said tines are adapted to deflect rearwardly in the direction of the trailing end of said shaft when encountering obstacles in or on the soil.

2. A rotary harrow adapted to be pulled behind a power source, comprising:

a longitudinal horizontally disposed shaft mounted in a frame, for rotation therein, such that in operation when said harrow is pulled by said power source, said shaft rotates at an acute angle to a line perpendicular to the line of travel, thus comprising a forward end and a trailing end;

said frame including:

a yoke;

an angle means including:

an angle adjustment plate, said plate being fixedly attached to said yoke and pivotally attached to said walking pivot hitch;

said plate including a plurality of apertures adapted to receive a pin;

said angle adjustment plate being attached to said yoke closer to the forward end of said shaft than the trailing end;

a walking pivot hitch, said walking pivot hitch being pivotally mounted to a power source, such that in operation, said harrow, when encountering obstacles or uneven terrain, can move up or down about an axis or tilt side to side about a second axis, said second axis being located to prevent the creation of an undesirable moment caused by side loading on the tines;

a plurality of planar mounting plates fixedly mounted at predetermined distances along said shaft and perpendicular thereto;

a plurality of tines circumferentially mounted on each of said each of said tines being of unitary construction having a flattened portion at the inner end for attachment to said mounting plates, and a rounded portion, at the outer end for engagement with the soil;

each of said tines being bent along its longitudinal axis such that the inner ends of said tines are closer than the outer ends of said tines to the forward end of said shaft;

wherein when in operation said tines are adapted to deflect rearwardly in the direction of the trailing end of said shaft when encountering obstacles in or on the soil.

3. A rotary harrow adapted to be pulled behind a power source, comprising:

a longitudinal horizontally disposed shaft mounted in a frame, for rotation therein, such that in operation when said harrow is pulled by said power source, said shaft rotates at an acute angle to a line perpendicular to the line of travel, thus comprising a forward end and a trailing end;

said frame including:

a yoke;

an angle means comprising:

a pair of spaced apart frame members fixedly mounted to a cross member at an acute angle;

one of said frame members being shorter than the other such that said shaft of said harrow has a leading end and a trailing end; and said cross member being fixedly connected at its opposite side to a pair of pivot brackets adapted to hole a horizontal pivot pin;

a walking pivot hitch, said walking pivot hitch being pivotally mounted to a power source, such that in operation, said harrow, when encountering obstacles or uneven terrain, can move up or down about an axis or tilt side to side about a second axis, said second axis being located to prevent the creation of an undesirable moment caused by side loading on the tines;

a plurality of planar mounting plates fixedly mounted at predetermined distances along said shaft and perpendicular thereto;

a plurality of tines circumferentially mounted on each of said mounting plates;

each of said tines being of unitary construction having a flattened portion at the inner end for attachment to said mounting plates, and a rounded portion, at the outer end for engagement with the soil;

each of said tines being bent along its longitudinal axis such that the inner ends of said tines are closer than the outer ends of said tines to the forward end of said shaft;

wherein when in operation said tines are adapted to deflect rearwardly in the direction of the trailing end of said shaft when encountering obstacles in or on the soil.

4. A rotary harrow as claimed in any one of claims 1, 2 or 3, wherein, when in operation, said harrow is pulled across the ground, said shaft rotates at a 20° to 40° angle from a line perpendicular to the line of travel.

5. A rotary harrow as claimed in any one of claims 1, 2 or 3, wherein said tines are bent at an angle of between 20° and 30°.

6. A rotary harrow as claimed in any one of claims 1, 2 or 3, wherein said tines are mounted on said mounting plate such that the longitudinal axis of said tines are located at an angle of 50° to 60° from the radial direction of said mounting plate.

* * * * *

UNITED STATES PATENT AND TRADEMARK OFFICE
CERTIFICATE OF CORRECTION

PATENT NO. : 5,355,963
DATED : October 18, 1994
INVENTOR(S) : Boyko et al.

It is certified that error appears in the above-indentified patent and that said Letters Patent is hereby corrected as shown below:

Claim 1, column 6, line 59, after "can move", insert the word --up--.

Signed and Sealed this

Second Day of May, 1995

Attest:

BRUCE LEHMAN

*Attesting Officer*  *Commissioner of Patents and Trademarks*